United States Patent
Amey, Jr. et al.

[11] Patent Number: 6,069,435
[45] Date of Patent: May 30, 2000

[54] CONNECTION METHOD FOR FIBER FIELD EMITTERS AND FIELD EMITTER CATHODES MADE THEREFROM

[75] Inventors: Daniel Irwin Amey, Jr., Hockessin, Del.; Henry Florentino Milgazo, Brick, N.J.

[73] Assignee: E.I. du Pont de Nemours and Company, Wilmington, Del.

[21] Appl. No.: 09/284,646

[22] PCT Filed: Oct. 6, 1997

[86] PCT No.: PCT/US97/18180

§ 371 Date: Apr. 13, 1999

§ 102(e) Date: Apr. 13, 1999

[87] PCT Pub. No.: WO98/16943

PCT Pub. Date: Apr. 23, 1998

Related U.S. Application Data

[60] Provisional application No. 60/028,677, Oct. 17, 1996.

[51] Int. Cl.[7] ..................................................... H01J 19/24
[52] U.S. Cl. ............................. 313/309; 313/336; 445/24
[58] Field of Search ...................... 313/336, 309, 313/351, 495, 496, 497, 422; 445/24

[56] References Cited

U.S. PATENT DOCUMENTS

| | | | |
|---|---|---|---|
| 3,866,077 | 2/1975 | Baker et al. | 313/336 |
| 4,055,780 | 10/1977 | Kawai et al. | 313/336 |
| 4,728,851 | 3/1988 | Lambe | 313/309 |
| 4,857,799 | 8/1989 | Spindt et al. | 313/495 |
| 5,015,912 | 5/1991 | Spindt et al. | 313/495 |
| 5,648,699 | 7/1997 | Jin et al. | 313/309 |

FOREIGN PATENT DOCUMENTS

| | | | |
|---|---|---|---|
| WO 94/15350 | 7/1994 | WIPO | H01J 1/62 |
| WO 94/15352 | 7/1994 | WIPO | H01J 19/24 |
| WO 94/28571 | 12/1994 | WIPO | H01J 19/24 |
| WO 95/22169 | 8/1995 | WIPO | H01J 1/30 |
| WO 97/07524 | 2/1997 | WIPO | H01J 31/12 |

OTHER PUBLICATIONS

R. M. Khatapova, et al., Technology For Producing Carbon Field Emitters, *Instruments and Experimental Techniques*, 28, No. 3, 729–731, May, 1985.

F. S. Baker, et al., The Carbon–Fibre Field Emitter, *Journal of Physics D; Applied Physics*, 7, No. 15, 2105–2115, Oct. 1974.

Davanloo et al., Laser Plasma Diamond, *Journal Material Research*, 5, No. 11, 2398–2404, Nov. 1990.

Tsumura Osamu—NEC Home Electronics Ltd., Manufacture of Frame Electrode, *Patent Abstracts of Japan*, 005, No. 121 (E–068), Abstract, Aug. 5, 1981 (Abstract of JP 56 059423A—May 22, 1981).

*Primary Examiner*—Michael H. Day

[57] ABSTRACT

A method for connecting, both mechanically and electrically, an electrically conducting field emission fiber (31) to an electrically conducting area of a substrate (32) involving placing the field emission fiber (31) across the surface of the substrate (32) and centering the field emission fiber (31) over the area of the substrate (32) where the connection is to be made, placing a metal ribbon (33) over the field emission fiber (31) with the dimension along the length of the metal ribbon (33) essentially perpendicular to the axis of the field emission fiber (31) and such that the metal ribbon (33) extends over the field emission fiber (31) with each end portion of the metal ribbon (33) in direct contact with the conducting area of the substrate (32), and bonding the metal ribbon (33) to the area of the substrate (32) and to the field emission fiber (31) by means of ultrasonic, thermocompression or compression bonding, substantially as shown in the figures, and described in the specification. The present method of connecting a field emission fiber to a substrate may be readily automated such that a multitude of such connections can be made.

7 Claims, 3 Drawing Sheets

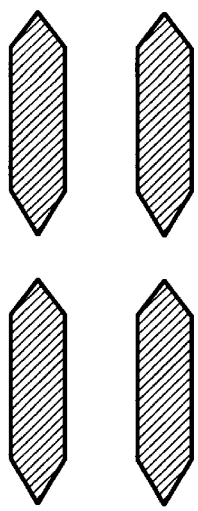
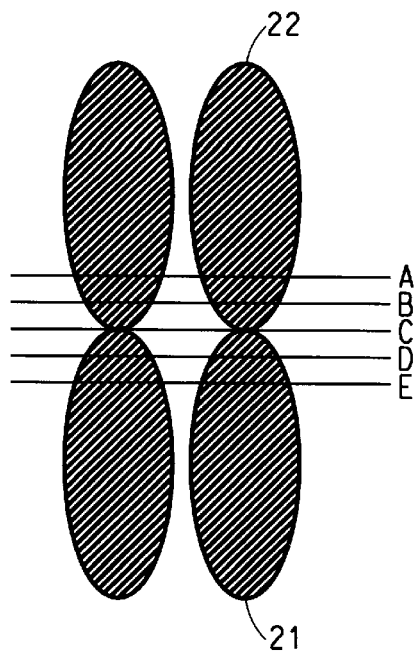
FIG.1a  FIG.1b
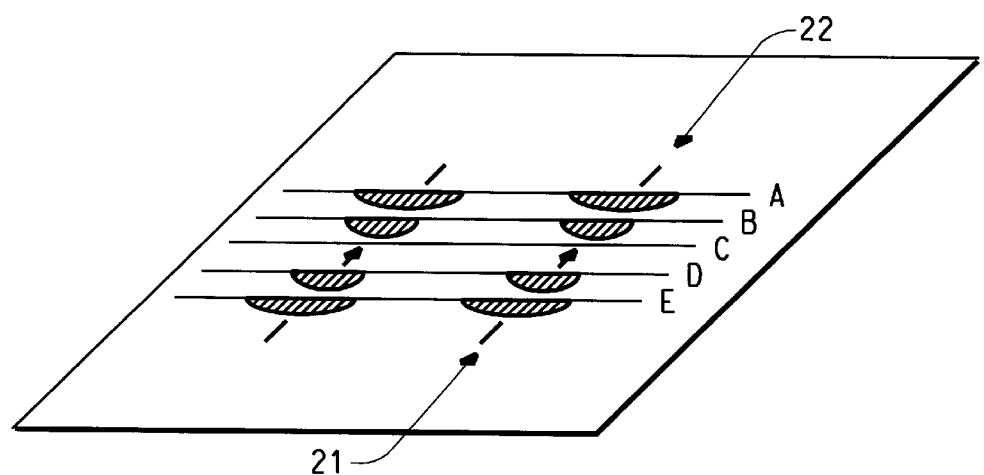
FIG.1c

CONNECTION METHOD FOR FIBER FIELD EMITTERS AND FIELD EMITTER CATHODES MADE THEREFROM

CROSS-REFERENCE TO RELATED APPLICATIONS

This application claims the benefit of U.S. Provisional Application No. 60/028,677, filed Oct. 17, 1996 and PCT International Application PCT/US97/18180, filed Oct. 6, 1997, wherein the United States was designated country.

FIELD OF THE INVENTION

This invention relates to a method for connecting, both electrically and mechanically, a field emission fiber to a substrate and particularly to the use of such a connection in a field emitter cathode used in display panels.

BACKGROUND OF THE INVENTION

Display panels are used in a wide variety of applications such as home and commercial televisions, laptop and desktop computers and indoor and outdoor advertising and information presentations. Flat panel displays are only a few inches thick in contrast to the deep cathode ray tube monitors found on most televisions and desktop computers. Flat panel displays are a necessity for laptop computers, but also provide advantages in weight and size for many of the other applications. Currently laptop computer flat panel displays use liquid crystals which can be switched from a transparent state to an opaque one by the application of small electrical signals. It is difficult to reliably produce these displays in sizes larger than that suitable for laptop computers. Plasma displays have been proposed as an alternative to liquid crystal displays. A plasma display uses tiny pixel cells of electrically charged gases to produce an image and requires relatively large electrical voltages and power to operate.

Flat panel displays having a cathode using a field emission electron source, i.e., a field emission material or field emitter, and a phosphor capable of light emission upon bombardment by electrons, have been proposed. Such displays have the potential for providing the visual display advantages of the conventional cathode ray tube and the depth, weight and power consumption advantages of the other flat panel displays. U.S. Pat. Nos. 4,857,799 and 5,015,912 disclose matrix-addressed flat panel displays using micro-tip cathodes constructed of tungsten, molybdenum or silicon. WO 94/15352, WO 94/15350 and WO 94/28571 disclose flat panel displays wherein the cathodes have relatively flat emission surfaces.

It has been discovered, see for example WO 95/22169, that a cathode comprised of fibrous electron field emitters, wherein the fibers lie essentially in the plane of the cathode and emission is achieved at desired regions along the length of the fiber, have advantages over previously disclosed cathodes. The fibrous cathode is supported by a substrate and further improved performance is achieved when the portions of the fibrous cathode addressed, and from which electron emission occurs, are suspended and not in direct physical contact with the substrate.

The instant invention provides a method for connecting, both electrically and mechanically, a field emission fiber to a substrate. Other objects and advantages of the invention will become apparent to those skilled in the art upon reference to the detailed description and drawings which follow hereinafter.

SUMMARY OF THE INVENTION

This invention provides a method for connecting, both mechanically and electrically, a field emission fiber to a substrate. This method comprises:

a) placing a field emission fiber across a substrate and centering the field emission fiber over the area where connection is to be made;

b) placing a metal ribbon over the fiber with the dimension long the length of the metal ribbon essentially perpendicular to the axis of the field emission fiber and such that the metal ribbon extends over the field emission fiber with each end portion of the metal ribbon in direct contact with the substrate; and c) bonding the metal ribbon to the substrate and to the field emission fiber by ultrasonic, thermocompression or compression bonding.

Preferably the metal ribbon is gold, aluminum or an aluminum alloy. The length of the metal ribbon is not critical. However, it must be sufficiently long to contour over the field emission fiber and have adequate portions on both sides of the field emission fiber to allow connection to the substrate. Typically, the width of the metal ribbon is from about 2 mil (0.05 mm) to about 40 mil (1 mm) and the thickness is from about 0.25 mil (0.006 mm) to about 2 mil (0.05 mm).

This invention also provides an improved fibrous cathode and an improved flat panel display containing a fibrous cathode wherein in each instance the improvement comprises a field emission fiber connected to the cathode substrate by means of a metal ribbon bonded to said substrate and to said field emission fiber.

This invention also provides an improved fibrous cathode and an improved flat panel display containing a fibrous cathode wherein in each instance the improvement comprises a field emission fiber mechanically and electrically connected to the cathode substrate.

In a preferred embodiment of this invention, the field emission fiber is connected to the cathode substrate at multiple places along the length of the field emission fiber.

An important advantage of this method of connecting a field emission fiber to a substrate is that it can be used in an automatic process in which a multitude of such connections can be readily made.

BRIEF DESCRIPTION OF THE DRAWINGS

FIGS. 1(a), 1(b) and 1(c) illustrate a suspended fibrous cathode and the use of the method of the invention to provide contacts at various places along the length of a field emission fiber.

DETAILED DESCRIPTION OF THE PREFERRED EMBODIMENTS

Figure 2:
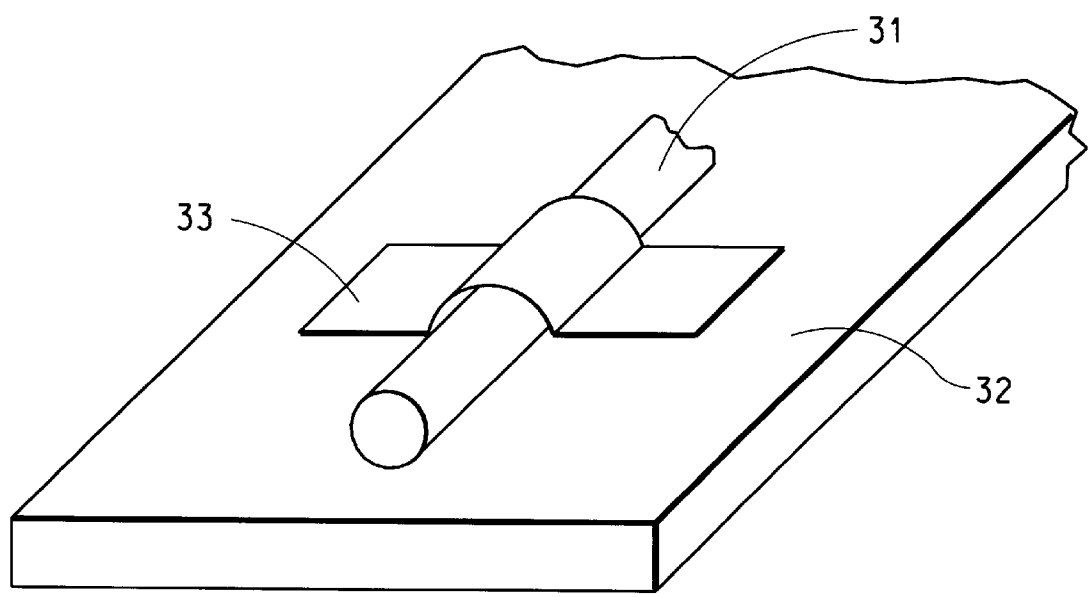
FIG. 2 illustrates the use of a metal ribbon to connect a field emission fiber to a substrate.

The present invention provides a method for connecting a field emission fiber to a substrate and thereby provides an improved fibrous cathode. As used herein, the term "fibrous cathode" embraces a cathode formed of at least one field emission fiber.

A flat panel display containing such a fibrous cathode is also improved. The flat panel display comprises (a) a fibrous cathode formed of at least one field emission fiber supported on a substrate, (b) an optically transparent electrically conductive film serving as an anode and spaced apart from the fibrous cathode, and (c) a phosphor layer, immediately adjacent to the anode, capable of emitting light upon bombardment by electrons emitted by the fibers. The improvement comprises the connection of the field emission fiber to the substrate by the method of this invention. It will be understood that the arrangement of the anode and the phosphor layer may vary without departing from the spirit of the invention. In other words, the phosphor layer may be positioned between the anode and the cathode or, alternatively, the anode may be positioned between the phosphor layer and the cathode. The flat panel display can also contain one or more gate electrodes situated between the anode and the cathode.

Flat panel displays are so-called because they are only a few inches thick. They are generally planar but can be curved or have other configurations as required by the specific application. Thus, as used herein, the terms "display panel" or "flat panel display" embrace planar and curved surfaces as well as other possible geometries.

The field emitter or field emission material used in the fibrous cathode of this invention is a field emission electron source. Various fiber geometries are possible in forming the fibrous cathode which is comprised of at least one such fiber. By "fiber" is meant one dimension substantially greater than the other two dimensions. The fibers can have any shape fiber cross-section, limited only by the design of the spinneret. Fibers may be bundled together in the fashion of multiple filaments.

These fibers can be made of the field emitter alone (e.g., graphite fibers) or can be a composite fiber of a non-field emitter core with a thin layer of field emitter surrounding the core. Preferably, the core material is conductive or semiconductive. In another embodiment, the fiber may consist of a more complex core structure, for example, a non-conductive core surrounded by a thin coating of conductive or semiconductive material with a field emission material surrounding the coating.

The connection method of this invention can be used with any field emission material. Diamond, diamond-like carbon or glassy carbon may be employed as the field emission material. The fibrous cathode can then be comprised of diamond, diamond-like carbon or glassy carbon composite fibers consisting essentially of diamond, diamond-like carbon or glassy carbon on non-diamond core fibers. The core material can be, e.g., a conductive carbon such as graphite or a metal such as tungsten, copper, titanium or molybdenum or can be, e.g., silicon or silicon carbide. In an alternate embodiment, the core can be a metallized insulator such as tungsten coated on a non-conductive polyester, nylon or Kevlar® fiber (Kevlar® is a registered trademark of E. I. du Pont de Nemours and Company, Wilmington, Del.). In other embodiments, a diamond, diamond-like carbon or glassy carbon precursor can be coated onto the non-diamond core and the diamond, diamond-like carbon or glassy carbon is then formed by appropriate treatment of the precursor.

It should be noted that in the embodiments of the invention, the axis of each fiber of which the fibrous cathode is comprised lies essentially in the plane of the cathode. Thus, electron emission from these fibers occurs along the length of the fibers utilized and not from the fiber tip or end.

Diamond fibers and fibrous diamond composites such as diamond-coated graphite or diamond-coated carbon preferably include a sub-micron scale crystal structure of diamond, i.e., diamond having crystal sizes of generally less than about 1 micron in at least one crystal dimension. Within the sub-micron sized diamond crystals, such diamond crystals include at least some exposed 111-oriented crystal facets, some exposed 100-oriented crystal facets, or some of both. Another form of diamond having suitable sub-micron dimensions is commonly referred to as cauliflower-diamond which has fine grained balls as opposed to a pyramidal structure.

Fibers including diamond-like carbon with an appropriate short range order, i.e., a suitable combination of $sp^2$ and $sp^3$ bonding may also provide for field emission materials with high current densities. By "short range order" is generally meant an ordered arrangement of atoms less than about 10 nanometers (nm) in any dimension. It may also be possible to use fibers, e.g., carbon fibers, coated with amorphic diamond via laser ablation as described by Davanloo et al. in J. Mater. Res., Vol. 5, No. 11, November 1990.

Fibers containing glassy carbon, an amorphous material exhibiting Raman peaks at about 1380 cm-1 and 1598 cm-1, as the field emitter material are also useful. "Diamond-like carbon" is used herein to designate the material referred to in the literature as diamond-like carbon as well as glassy carbon and carbon containing microscopic inclusions of glassy carbon, all of which are diamond-like in their performance as fiber field emission materials.

Generally, the composite fibers have a total diameter ranging from about 1 micron to about 200 microns. The diamond layer or coating in such a composite fiber can generally be from about 50 Angstroms (5 nm) to about 50,000 Angstroms (5 $\mu$m), preferably from about 1000 Angstroms (0.1 $\mu$m) to about 20,000 Angstroms (2 $\mu$m), more preferably from about 1000 Angstroms (0.1 $\mu$m) to about 5,000 (0.5 $\mu$m) Angstroms.

Diamond typically has several low index facets of low or negative electron affinity, e.g., 100-faceted diamond with a low affinity whereas 111-faceted diamond has a negative electron affinity. Diamond-like carbon or glassy carbon may preferably be n-type doped with, e.g., nitrogen or phosphorus, to provide more electrons and reduce the work function of the material.

Such a diamond or diamond-like carbon layer preferably has rough jagged edges such that a series of spikes and valleys is present upon the diamond or diamond-like carbon layer. In diamond coatings, this surface morphology results from a microcrystalline structure of the diamond material. It may be preferred that a minor amount of graphite be situated between at least a portion of said diamond crystals within said diamond coating for best results. It may also be preferred that diamond grown via CVD develop in columnar fashion due to slight misalignment between the growing crystals. This misalignment may also promote the development of the rough jagged edges of the diamond morphology.

The field emission fiber is supported on a substrate to provide a fibrous cathode. The substrate may be flat or may be undulating with one or more sets of regularly spaced parallel rows of crests and valleys. (See, e.g., WO 95/22169 for illustrations and more detail.) When the substrate is flat the whole length of each field emission fiber is in contact with the substrate. When the substrate is undulating a field emission fiber may be aligned along the length of each valley of the undulating surface again resulting in the whole length of each field emission fiber being in contact with the substrate. It can be advantageous to deposit an electrically conducting film on the area of the substrate which is in contact with the field emission fiber. When a flat substrate is used, strips of electrically conducting film corresponding to the rows of fibers can be deposited. For an undulating substrate, an electrically conducting film can be deposited along the length of each valley of the undulating surface before placing the composite fibers in the valleys. Metals such as copper, gold, chromium, molybdenum, and tungsten can be used. Such films provide electron reservoirs for the electron emission composite fibers and also enable the emission composite fibers in each valley to be addressed individually if desired.

It has been discovered that the performance of a fibrous cathode and a flat panel display comprised of a fibrous cathode is improved when the portions of the fibrous cathode addressed, and from which electron emission occurs, are suspended and not in direct physical contact with the substrate. Suspension of the field emission fiber can be accomplished in a number of ways. When the substrate is flat the field emission fiber can be suspended above the surface of the substrate on stand-offs or pedestals.

Undulating substrates can be especially useful in achieving suspended portions of the field emission fiber. In one such embodiment, the undulating portion comprises a regularly undulating surface on the substrate consisting of parallel rows of valleys and essentially flat crests. In this embodiment the fibrous cathode consists essentially of a regularly spaced parallel array of fibers, wherein the fibers are supported on the essentially flat crests of the substrate and suspended above the valleys of the substrate. For example, the undulating surface can formed by etching a smooth substrate such that the essentially flat crests correspond to lightly etched regions of the substrate and the valleys correspond to more heavily etched regions of the substrate. Preferably the fibers of the fibrous cathode are essentially perpendicular to the parallel rows of valleys and essentially flat crests. It is also preferable to have the substrate coated with a continuous strip of an electrically conductive material in the valleys and on the sides of the valleys of the set of parallel rows of valleys and essentially flat crests but not along the essentially flat crests. This thereby provides a substrate coated with a parallel array of continuous strips of electrically conductive material, one such strip along each row of valleys. This parallel array serves as a gate electrode.

A variation of this embodiment which can provide better control of the electron emission is one in which the valleys and the essentially flat crests occur in rows but these rows are not continuous, i.e., there is a region of the substrate along which the surface is undulating with a succession of valleys and essentially flat crests and on either side of this region are regions with essentially flat surfaces and on the other sides of both these flat regions are other regions along which the surface is undulating with a succession of valleys and essentially flat crests. Thus there are still parallel rows of valleys and essentially flat crests; however they are not continuous rows but rather rows of valleys with the valleys placed at regular intervals along each row and rows of essentially flat crests with the essentially flat crests placed at regular intervals along each row. Such an embodiment in which the undulating surface is formed by etching is shown in FIGS. 1(a), 1(b) and 1(c). FIG. 1(a) shows an etch pattern on the surface of the substrate. This pattern could be used to form the valleys and essentially flat crests. FIG. 1(b) shows the areas of the substrate that would be etched and FIG. 1(c) shows the depth profile along the 21-22 line of FIG. 1(b). The fibers of the fibrous cathode would be aligned along lines such as the 21-22 line of FIG. 1(b). It can be advantageous to deposit an electrically conducting film on the area of the substrate which is in contact with the field emission fiber, i.e., at positions along line C of FIG. 1(c). As indicated previously, metals such as copper, gold, chromium, molybdenum, and tungsten can be used and such films provide electron reservoirs for the electron emission composite fibers and enable electrical contact to be made at multiple places along the fiber.

Another embodiment of the use of an undulating substrate to suspend the field emission fiber involves a substrate which contains two sets of parallel rows of crests and valleys. The first set of parallel crests and valleys provide the valleys along which the fibrous cathode consisting essentially of at least one fiber is aligned. The second set of parallel crests and valleys is preferably perpendicular to the first set. The walls between the crests and valleys can be vertical. Sloped or curved sections can also be used. The parallel rows of crests and valleys are shown regularly spaced, i.e., the distance between the centers of two neighboring crests or between the centers of two neighboring valleys is the same within each set. Alternatively, when several phosphors are used (e.g., three phosphors can be used to provide a color display) these dimensions in the first set can be varied to compensate for differences in intensities of the different phosphors. In that case each triad, i.e., each set of three pair of crests and valleys, will be regularly spaced.

The valleys of the second set are typically narrower and less deep than the valleys of the first set. Typically, the valleys of the first set are from about 25 $\mu$m to about 250 $\mu$m deep and from about 10 $\mu$m to about 350 $\mu$m wide and the crests of the first set are from about 25 $\mu$m to about 250 $\mu$m wide. Typically, the valleys of the second set are from about 10 $\mu$m to about 150 $\mu$m deep and from about 50 $\mu$m to about 125 $\mu$m wide and the crests of the second set are from about 600 $\mu$m to about 700 $\mu$m wide. Typical ways of forming two such sets of parallel rows of crests and valleys on these substrate materials are etching, using ceramic GREEN TAPE™ (commercially available from E. I. du Pont de Nemours and Company, Wilmington, Del.), sandblasting, thick film sequential deposition and forging.

The valleys of the second set provide the means of suspending the fibrous cathode. The fibrous cathode can be placed along the length of each valley of the first set and be suspended by the surfaces of the valleys of the second set when these valleys are less deep than those of the first set. Preferably, a suspension element is disposed along the length of each of the valleys of the second set to support the fibrous cathode. The suspension element can be a continuous structure, e.g., a non-emission fiber aligned along the length of each valley and upon which the emission fibrous cathode rests. A film extended along the length of each valley could also be used. Before the fibrous cathode is positioned on the substrate, it is preferable to have the substrate coated with an electrically conductive material to provide means to apply a voltage to the fiber and create the electric field necessary for emission. The electrically conductive material coats the substrate except in the valleys and on the sides of the valleys of the second set thereby providing a substrate coated with a parallel array of continuous strips of electrically conductive material. This parallel array serves as a gate electrode. A non-emission fiber aligned along the length of each of the valleys of the second set on top of said fibrous cathode thereby anchoring said fibrous cathode in place can be used when suspension is by means of a non-emission fiber or means other than a non-emission fiber.

Alternatively the suspension element can be a discontinuous structure comprised of a series of pedestals or films on each valley of the second set at each intersection with a valley of the first set. The use of a suspension element is required when the valleys of the second set are as deep or deeper than the valleys of the first set.

The substrate can be made of insulators such as soda lime glass, Pyrex, and glass ceramics. A metal film on the substrate can serve as the substrate contact area for the connection. As used herein bonding the metal ribbon to the substrate embraces directly bonding the metal ribbon to the substrate as well as bonding the metal ribbon to a film, layer or other structured material deposited on or attached to the substrate.

For both flat and undulating substrates, the field emission fiber must be attached mechanically to the substrate and further there must be provision for making electrical contact to the field emission fiber. Typically such connections would be made at each end of the field emission fiber. This invention provides a method for connecting the field emission fiber to the substrate by means of a metal ribbon. As used herein, "metal ribbon" is used to describe a ribbon of material with electrical, mechanical and thermal properties similar to those of metals such as gold and aluminum. The field emission fiber is placed on the substrate and centered over the area where the connection is to be made. The metal ribbon is placed over and in direct contact with the field emission fiber. The dimension along the length of the metal ribbon is essentially perpendicular to the axis of the field emission fiber and the metal ribbon extends over the field emission fiber with each end portion of the metal ribbon in direct contact with the substrate. As a result, the field emission fiber is held firmly against the substrate. The metal ribbon is typically about 2 mil (0.05 mm) to about 40 mil (1 mm) wide and about 0.25 mil (0.006 mm) to about 2 mil (0.05 mm) thick. The length of the metal ribbon is not critical; however, it must be sufficiently long to surround and envelope or contour the field emission fiber and to provide an adequate portion of metal ribbon on either side of the field emission fiber to allow connection to the substrate. Ultrasonic, thermocompression or compression bonding is used to bond each end portion of the metal ribbon to the substrate and to bond the portion of the ribbon directly contoured around the field emission fiber to the field emission fiber.

In addition to providing means to connect the ends of a field emission fiber to a substrate, the method of this invention can be used to attach the field emission fiber to a substrate at positions intermediate to the two ends of the field emission fiber. Such connections can provide both mechanical and electrical advantages. It has been observed that the field emission fiber, and particularly the portion of the field emission fiber that is addressed and from which electron emission occurs, sometimes moves when being addressed. Such movement negatively affects the performance of the fibrous cathode. Intermediate connections will restrict such movement. Intermediate connections will also hold the field emission fiber in place during fabrication of the cathode assembly of the fibrous cathode and of the flat panel display. In addition, it can be advantageous to apply a voltage to the field emission fiber at various points along the fiber, e.g., at points closer to the portion of the field emission fiber being addressed to provide more uniform and consistent performance. For these reasons, the method of this invention is useful to provide intermediate connections along the length of the field emission fiber. It may be advantageous to create a flattened region on the substrate where the connections are to be made to provide better connections.

When the entire length of the field emission fiber is in contact with the substrate the connections can be made along the field emission fiber at places which are intermediate to the regions of the field emission fiber which are addressed and from which electron emission occurs.

When the field emission fiber is suspended above the substrate the connections can be made at the places on the substrate or suspension elements on the substrate from which the field emission fiber is suspended. In the case of the suspended fiber arrangement illustrated in FIGS. 1(a), 1(b) and 1(c), the connections can be made at positions along line C of FIG. 1(c) where the field emission fibers intersect line C and other corresponding positions along the field emission fibers.

FIG. 2 shows a field emission fiber 31 on a substrate 32. The metal ribbon 33 is shown placed over and in direct contact with the field emission fiber. The metal ribbon is contoured to the shape of the field emission fiber to better hold it to the substrate. The end portions of the metal ribbon on either side of the field emission fiber are bonded to the substrate and the portion of the metal ribbon directly contoured around the field emission fiber is bonded to the field emission fiber by ultrasonic, thermocompression or compression bonding.

All of these bonding techniques are achieved by bringing the two elements to be bonded into intimate contact and supplying sufficient energy to cause them to diffuse together.

Ultrasonic bonding is achieved by firmly pressing the metal ribbon between the bonding tool and the substrate or field emission fiber to which it is to be bonded and supplying a burst of ultrasonic energy usually at a frequency of about 60 kHz. The combination of the pressure and the ultrasonic energy results in a metallurgical weld between the metal ribbon and the substrate or to the field emission fiber. The temperature of the substrate may be elevated to facilitate the interdiffusion. This combination of providing pressure and thermal and ultrasonic energy is sometimes referred to as thermosonic bonding. As used herein, "ultrasonic bonding" embraces bonding in which the metal ribbon is firmly pressed between the bonding tool and the substrate or field emission fiber to which it is to be bonded and a burst of ultrasonic energy is supplied no matter whether the temperature of the metal ribbon and the substrate or field emission fiber is ambient or elevated.

Thermocompression bonding can be accomplished by applying pressure to the region of the metal ribbon that is in contact with the substrate or that which is in contact with the field emission fiber to provide the necessary intimate contact and simultaneously raising the temperature of those same regions. The temperature must be elevated to temperatures of the order of 370 to 380° C.

Compression bonding can be accomplished by applying pressure to a region of the metal ribbon that is in contact with the substrate or that which is in contact with the field emission fiber. Pressures needed are higher than in the other bonding techniques. Care must be taken in bonding to the field emission fiber.

Ultrasonic and thermocompression bonding are preferred.

EXAMPLE OF THE INVENTION

The following non-limiting example is provided to further describe and enable the invention.

The substrate, comprised of soda lime glass, a layer of chromium and a layer of gold upon which the field emission fiber would be placed, was prepared as follows. A soda lime glass substrate was cleaned with a detergent (Sparkleen® commercially available from Fisher Scientific) and rinsed well in deionized water. The water was removed in an isopropyl alcohol vapor drier. One side of the glass was coated with a 50 nm layer of chromium in the form of a series of circles each about 1 mm in diameter. A 200 nm layer of gold was deposited onto the chromium. The gold film would serve as the substrate contact area.

A graphite fiber with a diameter of 7 μm was placed on one of the gold contact areas of the substrate and positioned such that it was centered over the contact area. A piece of gold ribbon approximately 10 mil (250 μm) long, approximately 5 mil (125 μm) wide and 0.5 mil (13 μm) thick was placed over the graphite fiber at the contact area. This ribbon was centered over the graphite fiber. As a result, the graphite fiber is sandwiched between the contact area on the substrate and the metal ribbon. The substrate was heated to a temperature of 85° C. The metal ribbon was then bonded to the substrate and to the graphite fiber using a Kulicke and Soffa, Model #422, ultrasonic wire bonder. Each time a force of about 10 g was applied with the bonder and ultrasonic energy was applied for ¼ second. This resulted in the graphite fiber being mechanically and electrically connected to the substrate.

Electrical continuity was verified and the resistance found to be within the expected limits of the resistance of the graphite fiber.

Figure 3A:
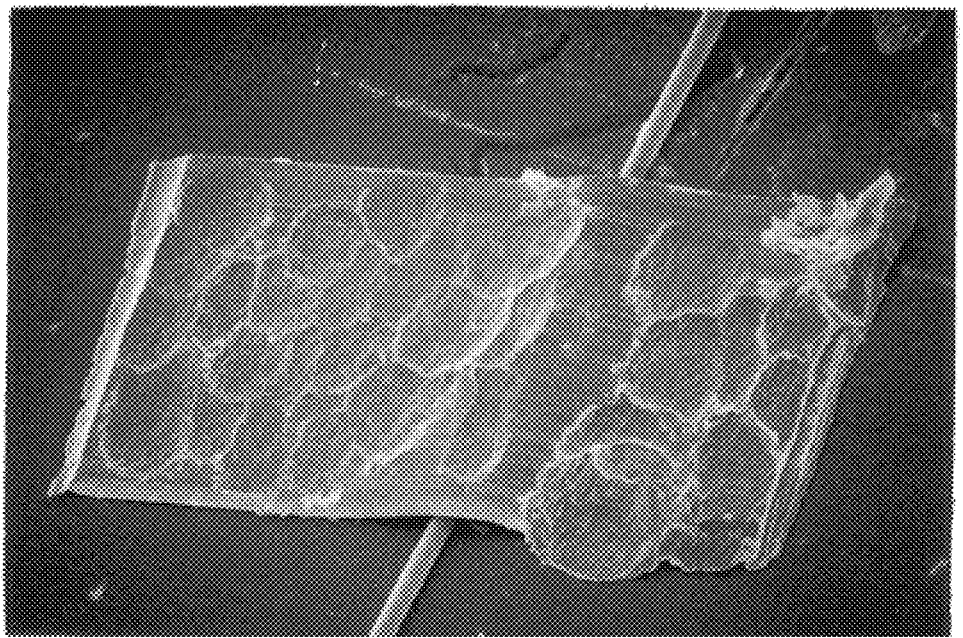
FIGS. 3(a) and 3(b) show two scanning electron micrographs of a metal ribbon connecting a field emission fiber to a substrate comprised of a thin gold film on soda lime glass.
Figure 3B:
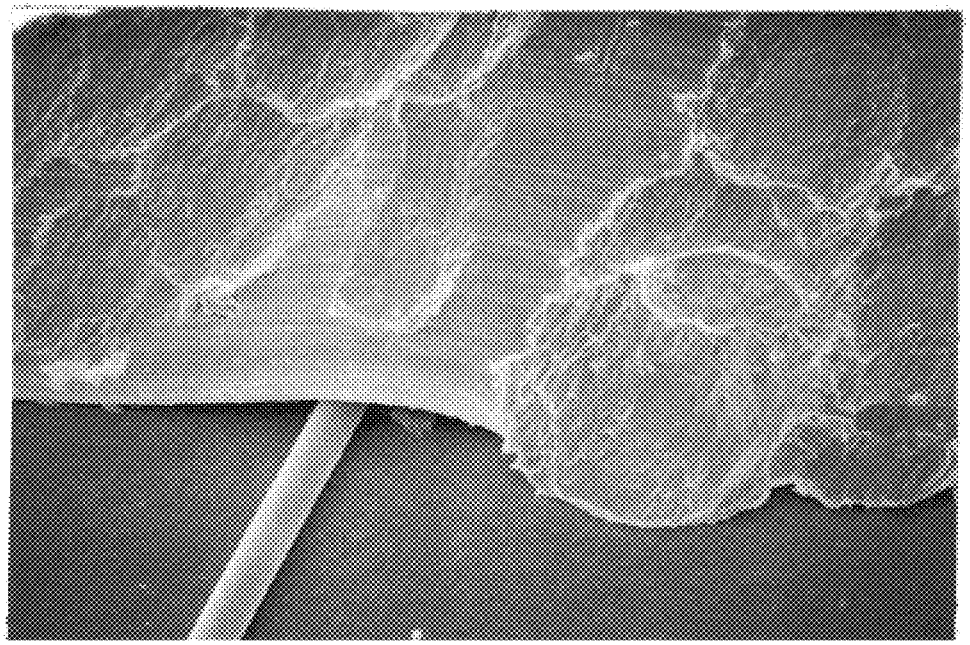

The graphite fiber attached to the substrate was analyzed by scanning electron microscopy (SEM). FIGS. 3(a) and 3(b) show scanning electron micrographs, at different magnifications, wherein the graphite fiber is attached to the substrate by the metal ribbon. The places at which the ultrasonic bonder was used are readily seen. In commercial practice, bonding could be made to take place in a continuous manner instead of in a series of individuals hits.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

We claim:

1. A method for connecting, both mechanically and electrically, an electrically conducting field emission fiber to an electrically conducting area of a substrate, comprising:

(a) placing said field emission fiber across the surface of said substrate and centering said field emission fiber over said area of said substrate where connection is to be made;

(b) placing a metal ribbon over said field emission fiber with the dimension along the length of said metal ribbon essentially perpendicular to the axis of said field emission fiber and such that said metal ribbon extends over said field emission fiber with each end portion of said metal ribbon in direct contact with said area of said substrate; and (c) bonding said metal ribbon to said area of said substrate and to said field emission fiber by means of ultrasonic, thermocompression or compression bonding.

2. The method of claim 1 wherein said metal ribbon is bonded to said substrate and to said field emission fiber by ultrasonic bonding.

3. The method of claim 1 wherein said metal ribbon is gold, aluminum or an aluminum alloy.

4. An improved fibrous cathode comprised of at least one field emission fiber and a substrate, characterized in that an electrically conducting field emission fiber is connected, both mechanically and electrically, to an electrically conducting area of a substrate by the method comprising:

(a) placing said field emission fiber across the surface of said substrate and centering said field emission fiber over said area of said substrate where connection is to be made;

(b) placing a metal ribbon over said field emission fiber with the dimension along the length of said metal ribbon essentially perpendicular to the axis of said field emission fiber and such that said metal ribbon extends over said field emission fiber with each end portion of said metal ribbon in direct contact with said area of said substrate; and (c) bonding said metal ribbon to said area of said substrate and to said field emission fiber by means of ultrasonic, thermocompression or compression bonding.

5. The improved fibrous cathode of claim 4 wherein said field emission fiber is connected to electrically conducting areas of said substrate at multiple places along the length of said field emission fiber.

6. The improved flat panel display containing the improved fibrous cathode of claim 5.

7. An improved flat panel display containing the improved fibrous cathode of claim 4.

* * * * *